United States Patent

[11] 3,590,642

| [72] | Inventor | Kai Lennart Rost<br>The Ledges, Hallowell, Maine 04347 |
|---|---|---|
| [21] | Appl. No. | 799,326 |
| [22] | Filed | Feb. 14, 1969 |
| [45] | Patented | July 6, 1971 |

[54] AUTOMATIC SAMPLER FOR A FLOWING LIQUID AND TESTING METHOD
14 Claims, 6 Drawing Figs.

[52] U.S. Cl. ................................................... 73/424
[51] Int. Cl. ...................................................... G01n 1/10
[50] Field of Search ......................................... 73/424, 423, 422 TC, 421 A

[56] References Cited
UNITED STATES PATENTS

| 442,017 | 12/1890 | Coplen | 73/424 |
| 797,144 | 8/1905 | Nickerson | 73/424 X |
| 1,593,623 | 7/1926 | Elliott et al. | 73/422 X |
| 2,091,810 | 8/1937 | Ferraez, Jr. | 73/421 (B) |
| 2,547,794 | 4/1951 | Stone | 73/424 X |
| 3,153,345 | 10/1964 | Berg | 73/423 |
| 3,279,259 | 10/1966 | Haley et al. | 73/421 (B) |

*Primary Examiner*—S. Clement Swisher
*Assistant Examiner*—Daniel M. Yasich
*Attorney*—Abbott Spear ABSTRACT: A sampler is disclosed for automatically taking samples from a flow at approximately uniform intervals and of approximately equal volumes. The sampler has a rotatable distributor for delivering liquid from the flow successively into a series of outlets, each in communication with the appropriate one of a series of sample containers. Each collected sample may be separately tested or a composite established with a percentage from each sample that is proportional to the rate of flow that existed at the time that sample was taken.

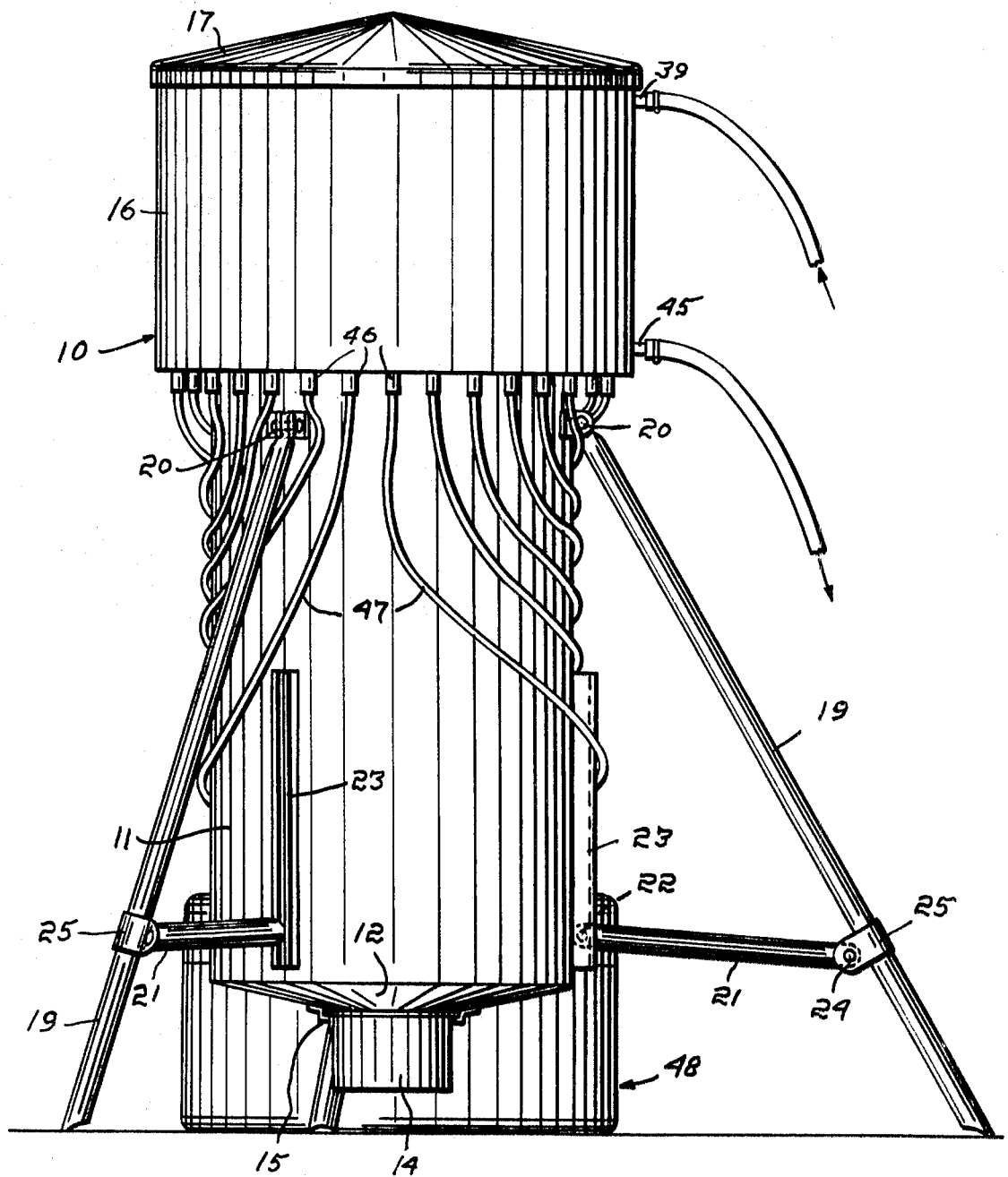

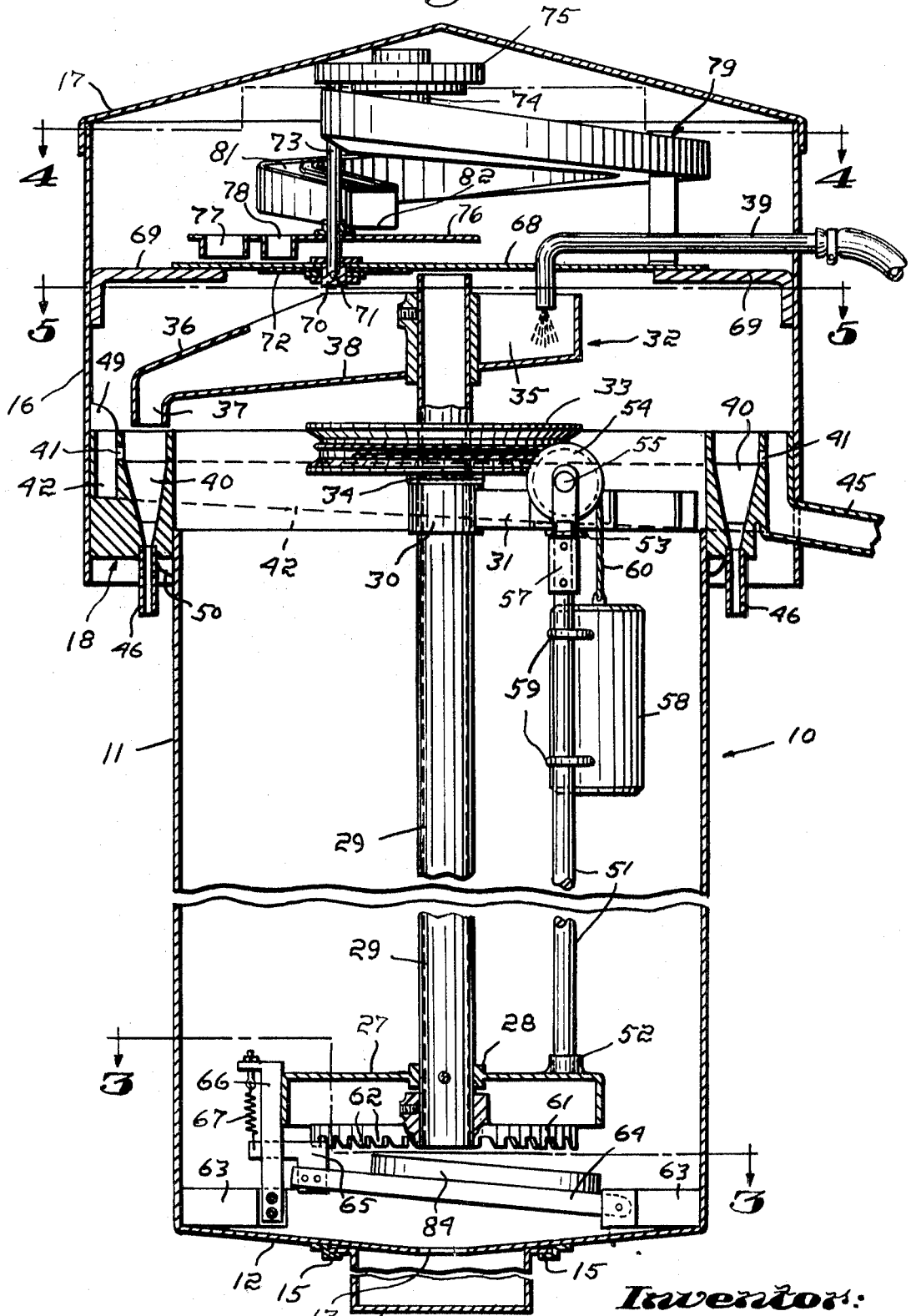

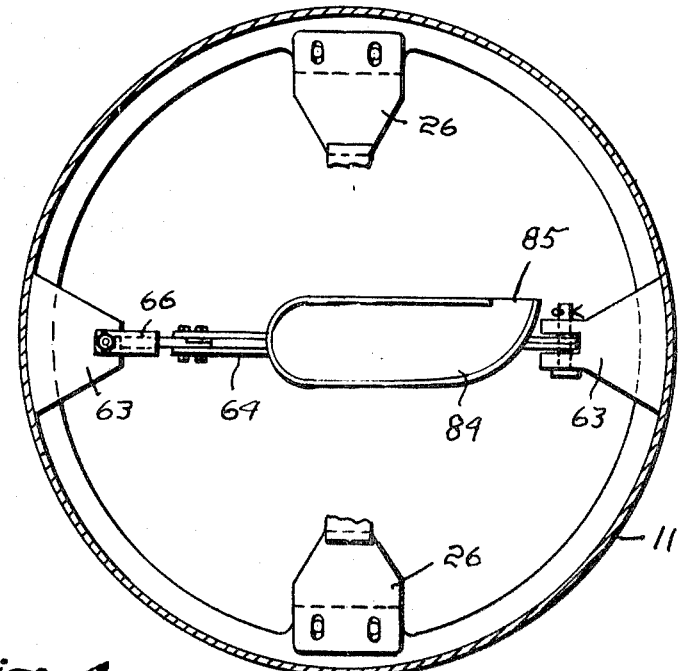
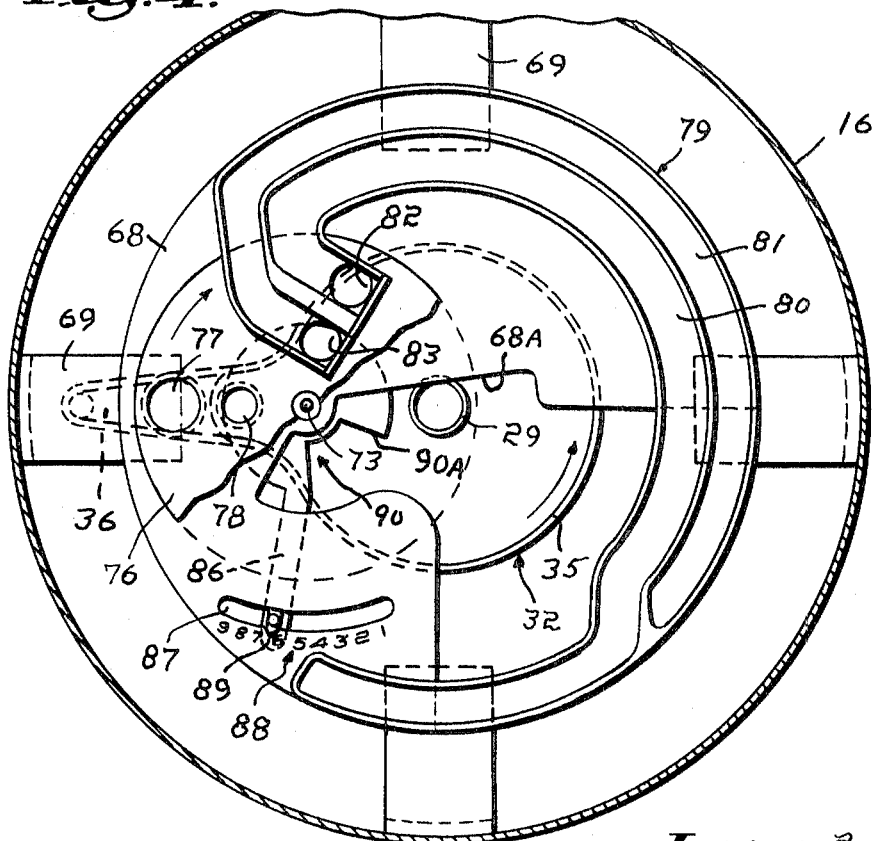

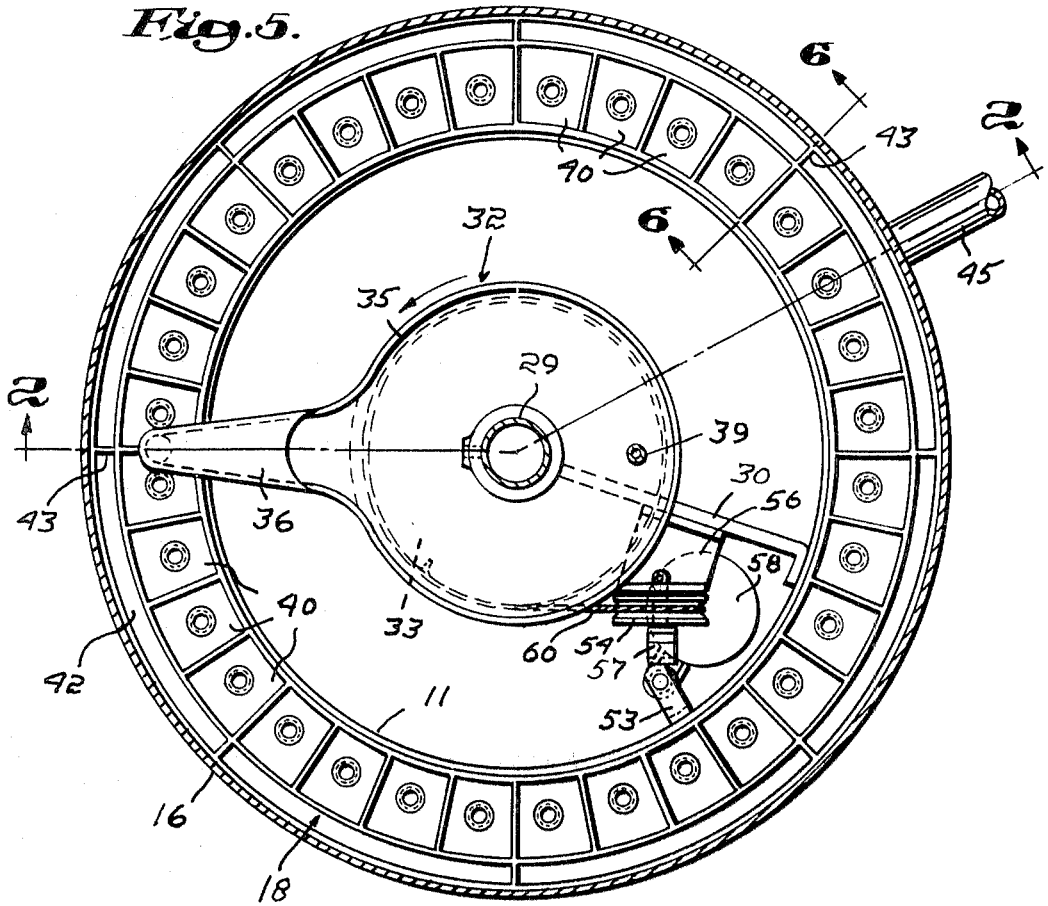

AUTOMATIC SAMPLER FOR A FLOWING LIQUID AND TESTING METHOD

The present invention relates to apparatus for automatically collecting samples of a liquid, the samples being of an approximately equal volume and collected at approximately equal intervals.

In industrial waste surveys, as examples of sampling a flow for analysis as to pollutants, rate of flow measurements and the analysis of samples are essential and it is with the latter that the present invention is concerned although the method relies on the availability of flow charts. Satisfactory equipment for measuring flow rates is presently available.

Sampling of a liquid flow at regular intervals is effected either manually or automatically. The manual collection of industrial samples is objectionable in that it is wasteful of manpower. Automatic samplers that are presently available work on either of two principles, the first of which involves the collection in one bottle of a predetermined volume at predetermined time intervals. Such samples provide acceptable results when the flow remains constant even though contents may vary. The other type of apparatus extracts a sample at predetermined time intervals in ratio to the flow.

Automatic samplers of the above types are not satisfactory because they cannot be used for flow conditions other than that for which they were designed. In addition, they are big, cumbersome, expensive, and difficult to install.

One principal objective of the present invention is to provide a method that combines the advantages of both procedures by providing separate samples in separate containers collected at substantially uniform intervals and of substantially equal volume. By consulting the flow chart of a flow recorder, the volume of flow at the time each sample was collected can be determined. A composite sample to the period of operation of the sampler can then be made by measuring the proportionate amount of each bottle. At the same time, the several samples can be analyzed separately if desired or if necessary.

Another principal objective of the invention is to provide a sampler that enables samples to be collected by approximately equal volume and taken at approximately uniform intervals, an objective attained by providing a sampler in which a distributor, adapted to continuously receive liquid for the flow, is rotated with its outlet opening downwardly over a concentric series of outlets, each outlet for connection with the appropriate one of a corresponding series of sample containers. Means are provided to rotate the distributor to effect the delivery of liquid to each outlet for a predetermined interval.

Another objective of the invention is to provide means to close each outlet when the predetermined volume of liquid has been delivered therethrough, whether or not liquid is still being delivered to that outlet and a further objective is to provide for the adjustablility of such outlet-closing means.

Another objective of the invention is to provide means to rotate the distributor on a step-by-step basis and a particular objective is to provide a step-by-step drive in which the distributor is rotatably biased in one direction with a yieldable detent holding it against rotation. The detent has a trigger released when contacted by a ball, the balls being released periodically from a chute.

Yet another objective of the invention is to provide each outlet with a seat adapted to be closed by a ball and the means to close the outlets are in the form of a supply of such balls together with means to deliver one ball into the seat of each outlet at the end of a predetermined liquid delivery period.

Another objective of the invention is the combination of two ball-delivering systems, the balls of one system operating the detent trigger and the balls of the other system closing the outlets, systems being controlled by a single, motor driven release, the release preferably having means by which the release of the outlet-closing balls may be adjusted relative to the release of the balls actuating the detent trigger.

In the accompanying drawings there is shown an embodiment of the invention illustrative of these and other of its objectives, novel features, and advantages.

In the drawings:

FIG. 1 is a side view of a liquid sampler in accordance with the invention,

FIG. 2 is a vertical section thereof on an increased scale,

FIGS. 3, 4 and 5 are sections taken along the indicated lines 3–3, 4–4, and 5–5, respectively, of FIG. 2, and FIG. 6 is a section taken along the indicated lines 6–6 of FIG. 5 on a further increase in scale.

A housing, generally indicated at 10, includes a lower cylindrical section 11 having its bottom 12 downwardly and inwardly inclined and provided with a central port 13 overlying a tray 14 removably supported in slideways 15. The housing includes an upper cylindrical section 16 having a removable cover 17 and of larger diameter than the lower section and joined thereto by a generally indicated circular tray 18, see FIG. 2. Legs 19, see FIG. 1, are pivotally connected as at 20 to the section 11 adjacent its upper end and braces 21 have pivots 22 confined in vertical slideways 23 on the lower end of the housing section 11. The braces 21 are pivotally connected as at 24 to sleeves 25, each sleeve secured to an appropriate one of the legs 19.

At the bottom of the section 11, see FIGS. 2 and 3, there are a pair of diametrically spaced mounts 26 positioning a transverse support 27 above the bottom 12 and provided with an axial bushing 28 rotatably receiving the lower end of a tubular shaft 29 the upper position of which is rotatably held within a bushing 30 carried by an arm 31 secured to the interior of the housing 10. Fast on the upper end of the shaft 29 is a generally indicated liquid distributor 32 and between the distributor and the bushing 30 there is a pulley 33 supported by a ball bearing unit 34 between the pulley and the bushing 30.

The distributor 32 includes, see FIGS. 2 and 5, a central circular part 35 and a radially disposed spout 36 having a downwardly disposed outlet 37. As may be seen in FIG. 2 the bottom 38 of the distributor slopes downwardly to the outlet 37. The inlet conduit 39 for the liquid being sampled is connected, in use, to a pump, not shown, whose intake is in communication with the waste water conduit or stream. The inlet 39 is disposed to discharge downwardly into the central part 35 of the distributor 32 and the spout outlet 37 is over a concentric series of funnel shaped outlets 40 with which the tray 18 is provided. Each outlet 40 has an overflow 41 in communication with an outer annular drain trough 42 divided by reinforcing partitions 43 having ports 44 as may be seen in FIG. 6. The trough 42 has an outlet 45 to be placed in communication with a drain or the waste water return conduit and it slopes downwardly, as will be apparent from FIG. 2, towards the outlet 45 from a diametrically opposite point Each outlet 40 has a tubular section 46 to enable tubing 47 to be connected thereto for delivery to the appropriate sample bottle, not shown, within the generally indicated bottle rack 48, see FIG. 1. The tray 18 has, see FIG. 6, upwardly disposed lugs 49 spaced along its outer edge to enable the upper section 16 to be secured thereto and downwardly disposed lugs 50 spaced along its inner edge for use in connecting the lower section 11 thereto.

In order that the distributor 32 may deliver liquid successively into the tray outlets 40, the shaft 29 is turned and a step by step shaft-turning drive is preferred to that purpose.

A vertical post 51, see FIGS. 2 and 5, is seated in a socket 52 carried by the support 27 and held at its upper end by an arm 53 secured to the inner surface of the housing section 11. A pulley 54 has its axle 55 held horizontally in brackets 56 and 57, the bracket 56 being fixed on the arm 31 and the bracket 57 being clamped to the post 51. A weight 58 is slidably attached to the post 51 by keepers 59 and a steel cable 60, anchored to the pulley 33 is trained over the pulley 54 and secured to the weight 58. With this arrangement, the weight 58 is operative to rotate the shaft 29 and accordingly the distributor 32 in the direction indicated by the arrow in FIG. 5 until the cable 60 is fully unwound or until the weight 58 comes to test on the support 27. Either arrangement may be employed to prevent the shaft 29 from turning sample-gathering period, light hours, for example.

The free rotation of the shaft 29 is prevented by fixing a holding wheel 61, see FIG. 2, on the bottom end of the shaft 29 below the support 27, the wheel 61 being in the form of a rim gear having a downwardly disposed series of uniformly spaced teeth 62 distributed over 360°. A pair of diametrically opposed mounts 63 are secured in the bottom of the housing section 11, each mount 63 spaced 90° from the mounts 26. A frame 64 is pivotally connected at one end to one mount 63 and has, at its other end a detent 65. The other mount 63 has a post 66 to which one end of a spring 67 is adjustably connected. The other end of the spring 67 is connected to the detent 65 and is operable yieldably to maintain the detent 65 between a pair of teeth 62 thus to hold the shaft 29 against turning.

In order that the shaft 29 will be accurately turned step-by-step with the steps being of the same time interval, means are employed to release the detent 65 at regular intervals.

To this end, plate 68 is supported by brackets 69 in the upper housing section 16 close to the upper end of the shaft 29 and as may be seen in FIG. 4, the plate 68 is cut away to expose the upper end of the tubular shaft 29 and a substantial portion of the central distributor part 35. The plate 68 has a holder 70, see FIG. 2, for a bearing 71, the holder 70 also rotatably supporting a disc 72 and the bearing 71 supporting the lower end of a shaft 73 of an electric motor 74, desirably of the synchronous type and having reduction gears in a gear box 75 providing, the embodiment of the invention being detailed, one revolution of the shaft 73 every 15 minutes.

The shaft 73 carries a disc 76 having radially aligned receivers 77 and 78 whose open ends are above but close to the plate 68. A ball tray 79 includes two downwardly inclined, curved racks 80 and 81 having downwardly opening discharge ports 82 and 83, respectively normally blocked by the disc 76. The racks 80 and 81 are shown as dimensioned for balls of different sizes, the racks 80 being for larger balls as will be apparent from a comparison of the discharge ports 82 and 83. The receivers 77 and 78 are the size of the ports 82 and 83, respectively, and as will be apparent from FIG. 4, as the disc 76 turns in the direction of the arrow, it receives one ball from each rack with one ball dropping into the tubular shaft 29 and the other ball dropping into the central part 35 of the distributor 32.

The frame 64 supports a ball receiver 84 below the bottom end of the shaft 29 to catch and receive the impact of a ball dropping through the shaft 29, the impact resulting in the detent 65 being dislodged from its wheel-holding position and permitting the weight 58 to turn the shaft 29. As the receiver 84 is depressed by impact, the spring 67 is operative to return the detent 65 immediately to its wheel-holding position. It will be noted that, in its normal position, the receiver 84 is inclined to insure that any ball therein will roll through its side port 85 into the bottom end of the receiver section 11 and then into the tray 14.

In the embodiment of the invention illustrated by the drawings, the distributor 32 services 32 outlets 40 defining 360° and the holding wheel 61 has accordingly 32 teeth. As the disc 76 is turned once every 15 minutes, samples may be collected through an 8 hour period.

While the distributor 32 is turned to deliver liquid to each of the outlets 40 for approximately the same interval, the volume delivered depends on the operation of the supply pump and the volume to be collected depends on the side of the sample containers.

It will be appreciated that on each revolution of the disc 76, a ball is dropped into the central part of the distributor 32 to roll into an outlet 40 to become a closure therefor. When all the outlets are thus closed, the continued operation of the supply pump results in a flow directly to waste.

It will be noted, see FIG. 4, that the disc 72 has an arm 86 whose outer end underlies an arcuate slot 87 in the plate 68 which has indicia 88 adjacent the slot 87. The arm 86 has a pointer 89 connected thereto by a screw enabling the arm 86 to be locked in any selected position relative to the indicia 88. The disc 76 has a notch 90 through which balls from the rack 81 drop into the distributor part 35 and the adjustment of the edge 90A of the notch 90 relative to the proximate edge 68A of the plate 68 provides a means for controlling the volume of liquid to be delivered through the outlets 40 to the sample containers connected thereto by providing for a change in the distance a ball in the receiver 78 must travel before it drops into the distributor 32. It will be apparent from FIG. 4 that with the pointer 89 at the right hand end of the slot 87, the balls in the receivers 77 and 78 will be released at the same time establishing the shorter collection interval, With the pointer 89 at the opposite end of the slot 87, the release of a ball in the receiver 78 is substantially delayed thereby increasing the interval in which the outlets 40 are open.

From the foregoing, it will be apparent that substantially uniform samples are obtained at substantially uniform intervals even with a continuous stream of liquid from the flow under test passing through the sampler. As each sample container has a known time factor if the sample containers are arranged, for example, in the same order as the outlets 40, a flow chart enables a composite to be accurately established by taking that percentage of each sample container that is indicated by the flow chart. In addition, samplers in accordance with the invention are well adapted to meet all requirements of use and service since the only outside power required is that necessary to turn the disc 76.

I claim:

1. Apparatus for collecting samples in a series of sample containers from a continuously running stream from a flow, said apparatus comprising a housing, a rotatable distributor within the housing, means effecting communication between said stream and said distributor, said distributor having an eccentric outlet, means to successively rotate said distributor, a series of sample outlets having their inlets within the housing arranged in the path of the distributor outlet to receive the discharge therefrom successively, one sample outlet for each sample container, means to close the inlet of each sample outlet after a Predetermined interval after the distributor starts discharging liquid therein, and a drain outlet from said housing in communication with the inlet of each sample outlet and operable on the closing thereof to receive liquid from the distributor thereafter while the distributor outlet is still in a position overlying the then closed sample outlet.

2. The apparatus of claim 1 in which the distributor rotating means effects the rotation of the distributor step-by-step.

3. The apparatus of claim 2 in which the distributor rotating means has a constant rate, and the outlet-closing means includes adjustable means operable to vary the interval thereof.

4. The apparatus of claim 1 in which the distributor rotating means comprises a rotatable shaft in support of the distributor, detent means releasably holding the shaft against turning, and means operatively connected to the shaft and yieldably urging the shaft to turn in a predetermined direction, and means operable to release the detent means at predetermined intervals to effect a successive step-by-step rotation of the distributor.

5. The apparatus of claim 4 in which the means for turning the shaft includes a pulley supported by the shaft, a vertical support, a weight vertically slidable on the support, a flexible connection trained about the pulley and connected to the weight, and a second pulley supported in the housing with its axis horizontal and located in a plane substantially tangential to the first named pulley, the cable also being trained over the second pulley.

6. The apparatus of claim 4 in which the shaft is hollow and the detent includes a receiver below the bottom end of the shaft and is pivotally connected to the housing on one side of the shaft axis and in an inclined position, and the detent releasing means includes and inclined ball tray having an outlet, the same number of balls in the tray as there are outlets served by the distributor, a horizontal plate, a rotatable disc overlying the plate having a ball escape port positioned to overlie the upper end of the shaft as the disc turns, the plate otherwise blocking the ball outlet of the tray, the disc otherwise blocking the tray outlet and a drive tor the disc operable to effect the transfer of a ball from the tray to the hollow shaft at predetermined intervals, the ball dropping through said ball escape port and striking the receiver effecting the release of the detent, before it rolls therefrom.

7. The apparatus of claim 6 in which the housing has a bottom wall provided with an outlet towards which the bottom wall is inclined so that balls rolling from the receiver escape from the housing, and a collecting tray removably attached to the bottom wall below the outlet therein.

8. The apparatus of claim 1 in which the means to close the outlets to the sample containers includes an inclined ball tray having an outlet, a series of balls in the tray, one for each said sample outlet served by the distributor, a horizontal plate, rotatably disc overlying the plate and having at least one ball escape port positioned to overlie the distributor as the disc turns, the plate having an opening through which a ball may drop the plate otherwise blocking the ball outlet of the tray, and a drive for the disc operable to effect the transfer of a ball from the tray into the distributor at predetermined intervals, and the bottom of the distributor is inclined downwardly towards the outlet to which a ball dropping into the distributor rolls into the outlet to which the distributor is then delivering liquid.

9. The apparatus of claim 8 and an adjustable member underlying the plate and movable relative to the opening to vary the distance a ball must travel with the disc before being released to drop into the distributor.

10. The apparatus of claim 8 in which the means to close the outlets to the sample containers includes a second inclined ball tray having outlet adjacent the outlet of the first named ball tray, a series of balls in the second tray, one for each outlet served by the distributor, said rotatable disc overlying the plate and having two radially aligned ball escape ports, one to overlie the upper end of the shaft and the other to overlie the distributor as the disc turns, the plate otherwise blocking the escape ports and the disc otherwise blocking the tray outlets, and the drive for the disc also being operable to effect the transfer of balls from the rear tray to the distributor at predetermined intervals.

11. The apparatus of claim 10 and means to vary the release of the balls from the disc that are received from one tray relative to the release of the balls from the other tray.

12. The apparatus of claim 1 in which the outlets serviced by the distributor are arranged as a circular series, the drain is in the form of a circular trough and an overflow port effecting communication between each outlet and the circular trough.

13. The apparatus of claim 12 in which the trough slopes downwardly in both directions from a point diametrically opposite the drain outlet.

14. The method of testing a liquid flow for pollution analysis that comprises the steps of collecting separate samples of approximately the same volume at regular intervals for a predetermined time, monitoring the flow during that time, and then preparing a composite by taking that amount of the liquid from each sample that is proportional to the flow rate prevailing at the time that sample was taken and combining such amounts.